United States Patent [19]
Heiss

[11] 3,917,404
[45] Nov. 4, 1975

[54] FLUOROMETER ASSEMBLY INCLUDING A FLOW CELL

[75] Inventor: Louis Robert Heiss, Annapolis, Md.

[73] Assignee: Baxter Laboratories, Inc., Deerfield, Ill.

[22] Filed: May 28, 1974

[21] Appl. No.: 474,099

[52] U.S. Cl. .................. 356/85; 250/363; 250/373; 250/576; 356/181
[51] Int. Cl.² .......................................... G01J 3/30
[58] Field of Search ...... 356/85, 181; 250/363, 365, 250/373, 574, 576

[56] References Cited
UNITED STATES PATENTS

| | | | |
|---|---|---|---|
| 2,076,553 | 4/1937 | Drinker et al. | 250/576 X |
| 2,381,414 | 8/1945 | Wilkie | 250/365 |
| 2,549,574 | 4/1951 | Condiff | 250/365 X |
| 2,889,736 | 6/1959 | Borg | 250/576 X |
| 3,418,061 | 12/1968 | Schultz | 356/246 |
| 3,622,795 | 11/1971 | Dorman et al. | 250/576 |

FOREIGN PATENTS OR APPLICATIONS 1,109,269  4/1968  United Kingdom................ 250/574

Primary Examiner—James B. Mullins
Attorney, Agent, or Firm—Herman L. Gordon; Richard G. Kinney

[57] ABSTRACT

A fluorometer assembly consisting of a basic photometer unit having a photomultiplier tube and an excitation lamp projecting from its top wall. A flow cell block assembly is adapted to be mounted over and receive the photomultiplier tube and excitation lamp in cavities provided therefor in the block assembly. The block assembly includes a transparent flow cell and conduits are provided to pass a liquid sample through the flow cell. An optical passage is provided between the lamp cavity and flow cell, including a suitable excitation filter. Another optical passage at right angles to the first passage is provided between the flow cell and the photomultiplier tube cavity. A suitable emission filter is provided on the photomultiplier tube in the path of fluorescent light emitted by the sample liquid. The lamp has a manually rotatable slotted cover sleeve for at times blocking the lamp relative to the flow cell. The cell is held in place by a manually adjustable pressure screw, which also acts to exert a sealing force on a top plug element of the flow cell. The flow cell block assembly also includes a temperature-controlling cavity through which temperature-control liquid may be circulated.

19 Claims, 12 Drawing Figures

WRATTEN GELATIN FILTER

FLUOROMETER ASSEMBLY INCLUDING A FLOW CELL

This invention relates to fluorometer devices, and more particularly to fluorometer apparatus of the flow cell type.

A main object of the invention is to provide a novel and improved fluorometer apparatus which is relatively simple in construction, which is easy to operate, which is versatile in use, and which is readily adaptable for performing a wide range of fluorometric tests.

A further object of the invention is to provide an improved fluorometric flow cell attachment for a photometer, the attachment being inexpensive to manufacture, being compact in size, and minimizing the need for expensive optical components.

A still further object of the invention is to provide a fluorometric flow cell attachment of the filter type for a photometer, the attachment having increased sensitivity as compared with prior instruments because the sample chamber (flow cell element) thereof is located much closer to the light source of the system, and the photomultiplier tube of the system is located much closer to the sample chamber, than has been possible in previous comparable instruments.

A still further object of the invention is to provide an improved fluorometric flow cell attachment for a photometer which includes effective means for temperature stabilization, which has easily operable shutter means for performing dark current correction operations, which is substantially self-aligning when it is mounted on an associated basic photometer unit, and which has means for establishing and maintaining a leak-proof seal between its fluorescence observation chamber and the associated flow tubing.

A still further object of the invention is to provide an improved fluorometric flow cell attachment for a photometer, the attachment being engageable on the top of a basic photometer unit and being provided with cavities to receive an upstanding photomultiplier tube and an excitation lamp forming part of the photometer unit, the engagement of the attachment on the photometer unit automatically establishing the optical system required for continuous fluorometric studies of a liquid sample conveyed through the attachment, the attachment being rugged in construction, being stable in performance, and providing highly accurate fluorescence readings, whereby the attachment can be employed with high efficiency for a wide range of fluorometric or other similar types of optical studies of sample materials.

A still further object of the invention is to provide an improved flow cell attachment for a photometer wherein the attachment is provided with a recess or cavity for snugly receiving a transparent sample chamber and has meaans for positively fixing the chamber in its correct optical position and for establishing a reliable seal between the sample chamber and its associated fluid connection conduits.

Further objects and advantages of the invention will become apparent from the following description and claims, and from the accompanying drawings, wherein:

Figure 1:
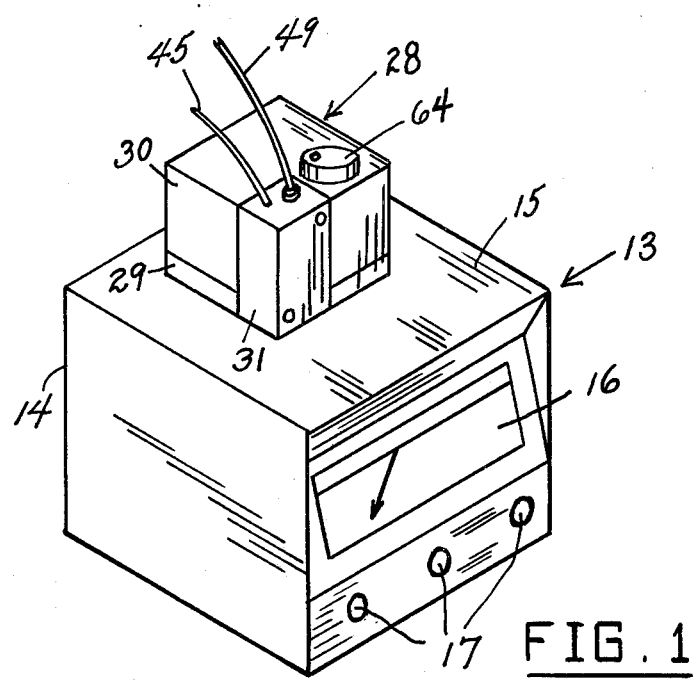
FIG. 1 is a perspective view of a basic photometer unit with a detachable fluormetric flow cell assembly mounted thereon in operating position, in accordance with the present invention.

Referring to the drawings, 13 generally designates a basic photometer unit having a main housing 14 provided with a horizontal top wall 15. The photometer unit 13 has a readout meter 16 and conventional operating controls 17, and employs conventional circuitry. The photosensitive element of the photometer unit 13 comprises a photomultiplier tube 18 which is mounted in a socket 19 engaged through an aperture 20 formed in top wall 15, said socket having a top flange 21 bearing on top wall 15 and having an externally threaded neck portion 22 on which is engaged a clamping ring 23 engaging clampingly beneath the top wall 15, as shown in FIG. 7, whereby the socket is supported so that the photomultiplier tube 18 projects upwardly from top wall 15.

Figure 2:
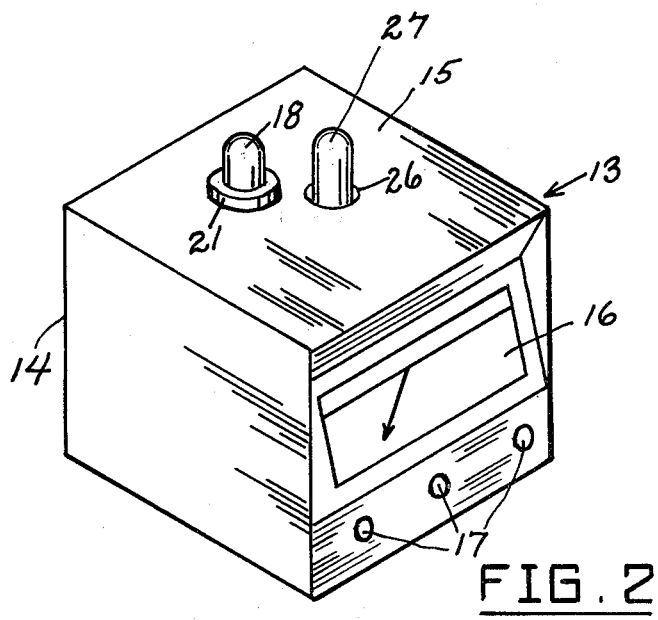
FIG. 2 is a perspective view of the basic photometer unit of FIG. 1, with the flow cell assembly removed.

The basic photometer unit 13 also is provided with a suitably wired socket 24 mounted on a supporting bracket 25 in main housing 14, located subjacent an aperture 26 in top wall 15 to receive an excitation lamp 27 which projects upwardly through aperture 26, as shown in FIG. 2, the lamp being located a short distance from the photomultiplier tube 18. The lamp may be at times removed to enable the photometer to be employed with a reaction chamber to perform chemiluminescence or bioluminescence tests, or the like, as is disclosed in my prior U.S. Pat. No. 3,764,214, issued Oct. 9, 1973, entitled "Photometer Apparatus".

Designated generally at 28 is a flow cell attachment which may be employed in cooperating with the basic photometer unit 13 to perform fluorometric tests on liquid samples. The flow cell attachment 28 comprises a main block assembly consisting of a generally L-shaped base block 29 on which is clampingly and sealingly secured a conformably shaped main block 30, defining a corner recess adapted to receive aa rectangular flow cell block 31, which may be secured in close-fitting contact in said corner recess by means of a pair of diagonally opposite clamping screws 32, 32.

Figures 6, 8:
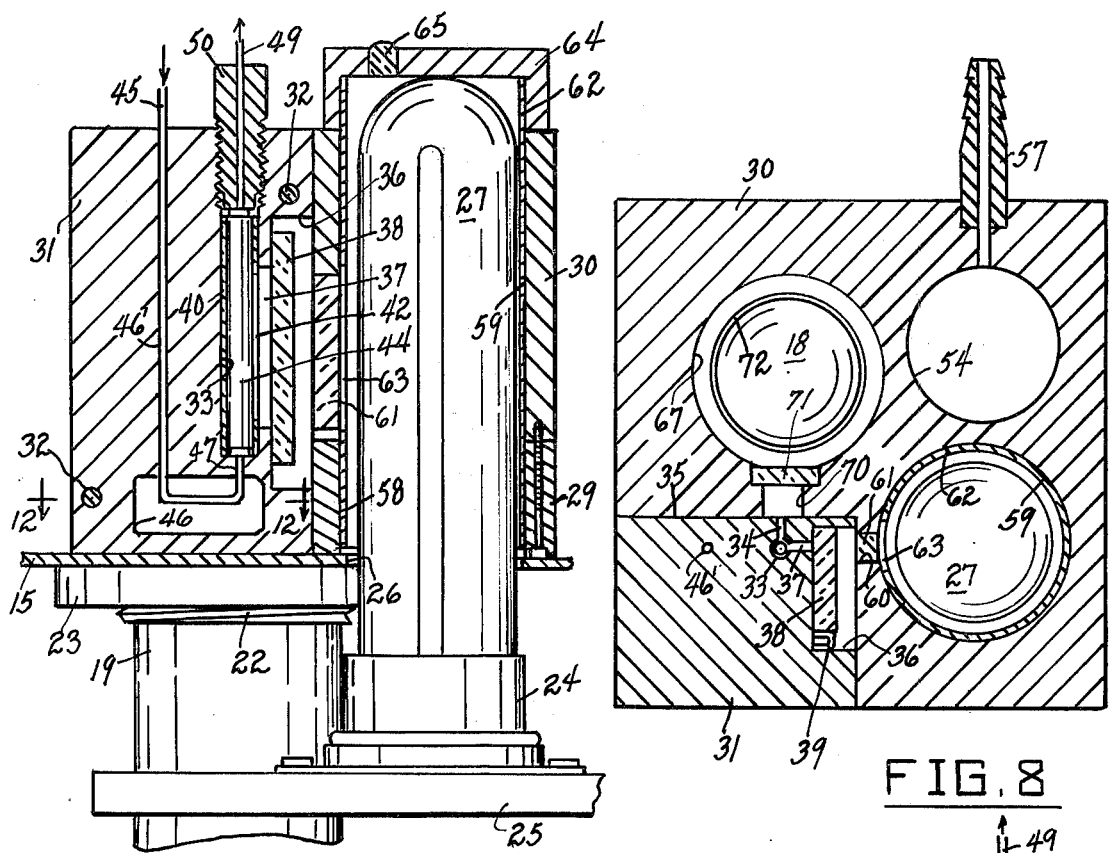
FIG. 6 is a vertical cross-sectional view taken substantially on the line 6—6 of FIG. 3, but showing adjacent parts of the associated basic photometer unit shown in FIG. 1.
FIG. 8 is a horizontal cross-sectional view taken substantially on the line 8—8 of FIG. 4.
Figures 7, 10, 11:
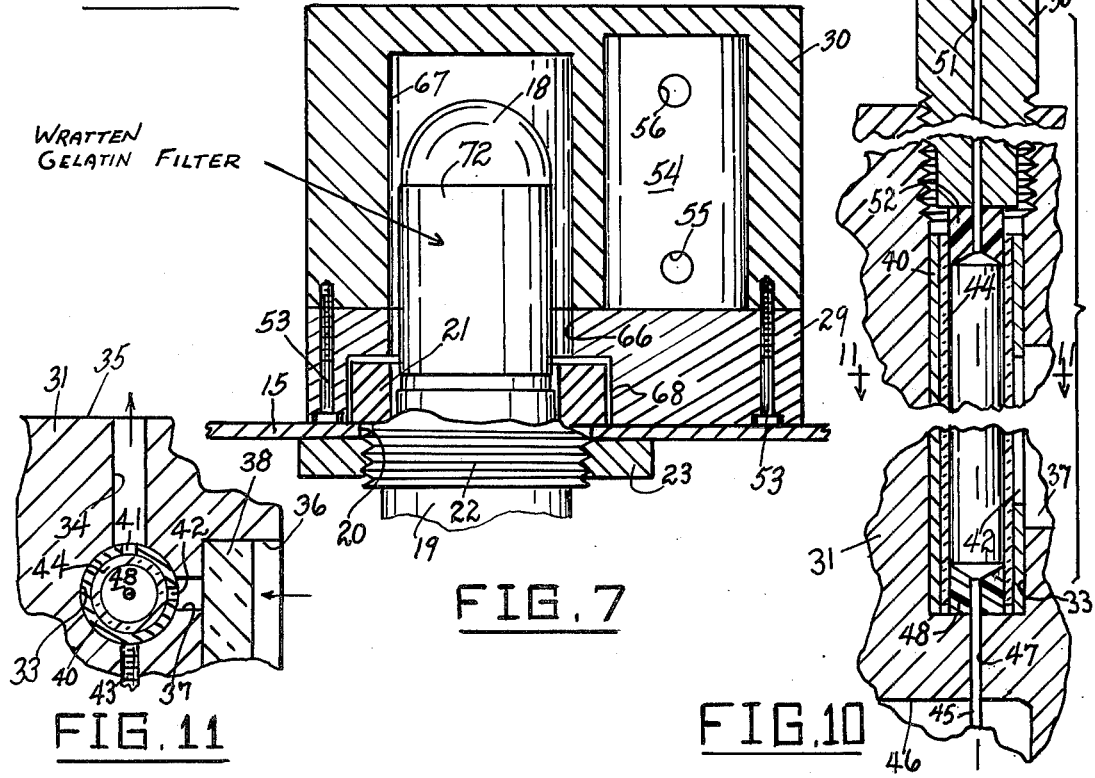
FIG. 7 is a similar vertical cross-sectional view taken substantially on the line 7—7 of FIG. 3.
FIG. 10 is an enlarged fragmentary vertical cross-sectional view taken substantially on the line 10—10 of FIG. 3.
FIG. 11 is a horizontal cross-sectional view taken substantially on the line 11—11 of FIG. 10.

The flow cell block 31 is formed with a cylindrical vertical bore or recess 33 and with a first vertical radial slot 34 extending from the recess 33 perpendicularly to the rear face 35 of block 31, as shown in FIG. 11. The right side portion of block 31, as viewed in FIGS. 8 and 11, is formed with a rectangular filter-receiving recess 36 and with a vertical slot 37 extending radially from recess 33 and at right angles to slot 34, thereby communicating perpendicularly with filter recess 36. A suitable excitation filter plate 38 is removably secured in recess 36, as by means of spring clips 39, as shown in FIG. 8.

An opaque cylindrical metal sleeve 40 is snugly received in recess 33, said sleeve 40 being formed with respective longitudinal slots 41 and 42 registering with the passages 34 and 37, the sleeve being suitably locked in a stationary position, as by a set screw 43. Snugly received in the metal sleeve 40 is a cylindrical transparent flow tube 44.

A liquid sample inlet capillary tube 45 is engaged through a vertical bore 46' in block 31 and extends through a rearwardly opening access recess 46 and throuogh a vertical bore 47 communicating axially with the bottom of recess 33. The end of capillary tube 45 is sealingly secured in a bottom resilient deformable plug member 48, of Teflon, or the like, sealingly engaged in the bottom end of flow tube 44, abutting against the bottom of recess 33.

A liquid sample outlet capillary tube 49 extends loosely through an axial bore 51 in a rigid screw plug member 50 threadedly engaged in block 31 above recess 33, the lower end of tube 49 being sealingly secured in a resilient deformable top plug element 52, of Teflon, or the like, sealingly engaged in the top end of flow tube 44, the bottom end of screw plug member 50 bearing downwardly on plug element 52 and holding it in place in tube 44 with a desired degree of tightness. The tightening force of screw plug 50 is likewise transmitted through the tube 44 so as to insure proper sealing retention therein of the bottom plug element 48.

The main block members 29 and 30 are clampingly and sealingly secured together in a suitable manner, as by fastening screws 53 extending upwardly through lower block member 29 and threadedly engaging in upper block member 30, as shown in FIG. 7. Diagonally opposite the rectangular corner recess receiving flow cell block 31 the main block member 30 is formed with a generally cylindrical cavity 54 for receiving temperature-control liquid, said block member 30 having a lower inlet passage 55 and an upper outlet passage 56 communicating with cavity 54 and provided with external conduit fittings 57 for connecting the cavity in a fluid circuit including a suitable source of temperature-controlled liquid.

The main block members 29 and 30 have registering cylindrical bores 58 and 59 spaced forwardly from liquid cavity 54 so as to receive the upstanding excitation lamp 27, in the operating position of attachment 28. The wall of block member 30 is formed with a vertical slot 60 which is registrable with slot 37 of flow cell block 31. Slot 60 is provided with a transparent quartz window 61.

A shutter sleeve 62 having a reflective inside surface is rotatably mounted in the cylindrical cavity defined by the registering bores 58 and 59, said sleeve having a vertical slot 63 which is registrable with window 61. As shown in FIG. 6, sleeve 62 projects upwardly a short distance from the top surface of block member 30 and has an opaque cover cap 64 secured on its top portion, said cover cap being provided near its periphery with a small transparent index window 65 in the same radial vertical plane as slot 63, which, in one position thereof may be aligned with and placed adjacent to screw plug element 50 to place slot 63 in registration with window 61 and slot 37. By rotating sleeve 62 away from this position, by means of cover cap 64, window 61 may be blocked, enabling dark current measurements to be made.

Figure 9:
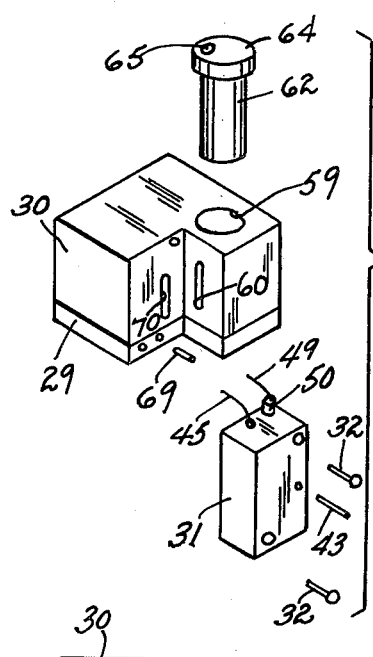
FIG. 9 is a perspective diagrammatic view showing the flow cell assembly of FIGS. 1 and 3 to 8, with parts in separated positions.
Figure 4:
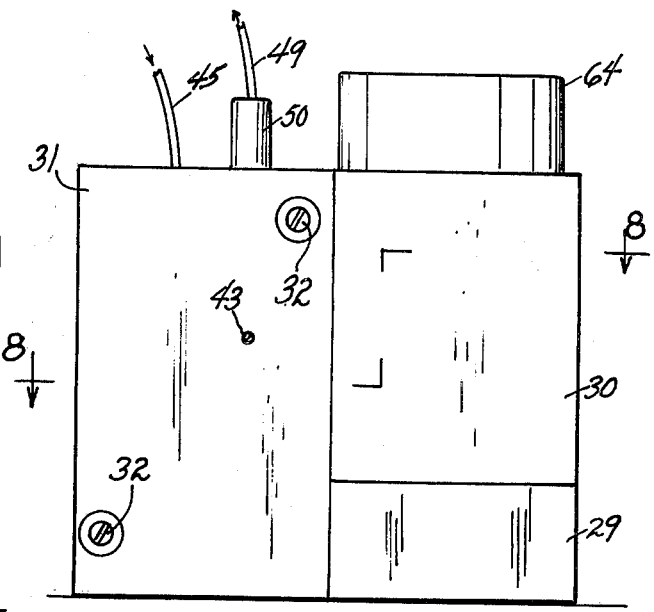
FIG. 4 is a front elevational view of the flow cell assembly of FIG. 3.
Figure 3:
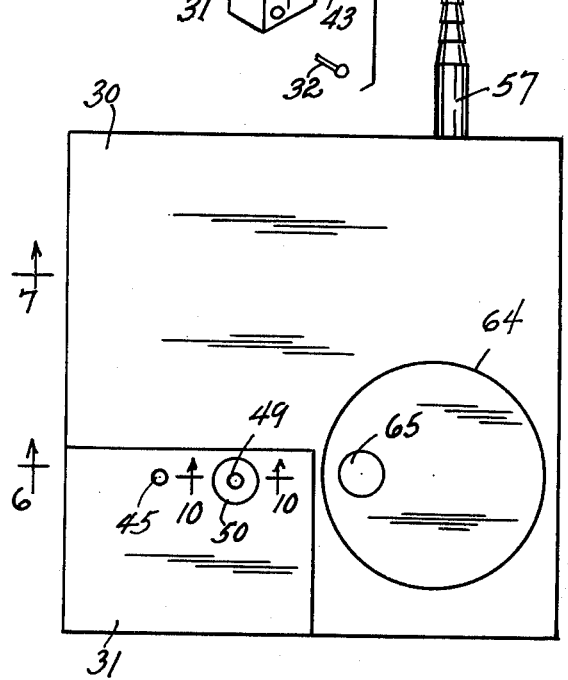
FIG. 3 is an enlarged top plan view of the fluorometric flow cell assembly employed in FIG. 1.
Figure 12:
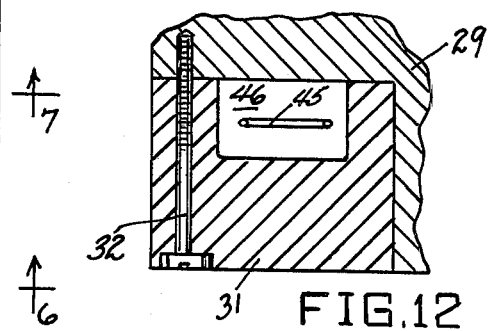
FIG. 12 is a fragmentary horizontal cross-sectional view taken substantially on the line 12—12 of FIG. 6.
Figure 5:
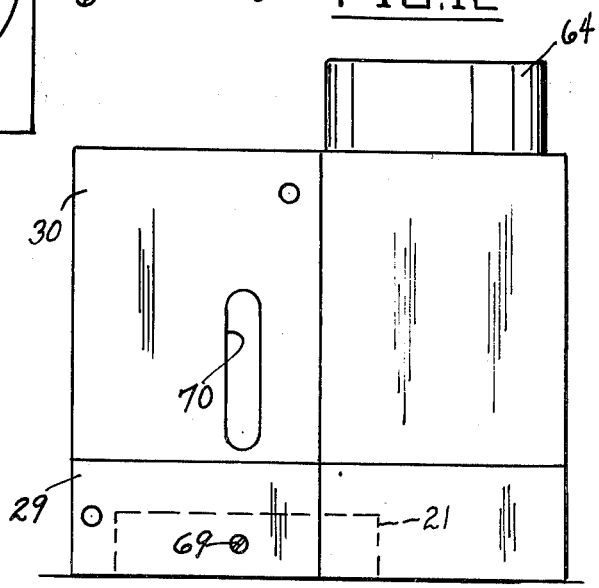
FIG. 5 is a front elevational view of the flow cell assembly, similar to FIG. 4 but with the flow cell supporting block removed.

The main block members 29 and 30 have additional registering bores 66 and 67 rearwardly offset from bores 58 and 59 and spaced laterally from cavity 54 to define a cavity to receive the upstanding photomultiplier tube 18. The bottom of block member 29 is counterbored around bore 66 to define a recess to receive flange 21, as shown at 68 in FIG. 7. A set screw 69 may be employed (see FIGS. 5 and 9) to releasably lock block member 29 to flange 21.

Block member 30 is formed with a vertical slot 70 registrable with passage 34 to transmit fluorescent light from the flow cell element 44 to the photomultiplier tube 18. A transparent quartz window 71 is secured in the inner portion of the slot 70, as shown in FIG. 8. A suitable Wratten gelatin filter 72 is secured around photomultiplier tube 18 to select the desired fluorescence emission wavelength.

In operation, liquid material to be tested is circulated at a desired rate through the flow tube element 44. After the initial dark current correction reading has been made (with sleeve 59 in light-obstructing position as above explained), slot 63 is aligned with passage 37. The liquid sample is thus exposed to excitation light whose wavelength is selected by the filter element 38. Fluorescence emission from the sample passes through slot 41, passage 34, passage 70 and window 71, and thence through the Wratten filter 72 to the photomultiplier tube 18. Continuous fluorescence emission readings may be made by connecting the output of the photometer unit 13 to a conventional recorder.

It will be noted that since the lamp 27 and the photomultiplier tube 18 are located relatively close to the flow cell element 44, the optical paths are relatively short, and therefore the instrument has high sensitivity. Furthermore, the provision for circulating temperature-controlled liquid through the cavity 54 makes the instrument very stable in operation, since it can be readily maintained at constant temperature over long periods of time.

The conduits 45 and 49 may comprise Teflon tubing, or the like. Black sleeving, or other suitable light-exclusion means, may be provided on the tubing to prevent room light from entering the flow cell system.

While a specific embodiment of an improved fluorometer apparatus has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A flow cell block assembly for use with a photometer of the type having an upstanding photosensitive element and an upstanding excitation lamp adjacent to each other, said flow cell block assembly having respective vertical bores spaced to receive said photosensitive element and excitation lamp and including a transparent vertical flow cell with inlet and outlet conduits connected to the ends thereof for passing a liquid sample therethrough, and means to exert adjustable retaining force on the top end of said flow cell, said block assembly being formed with passage means at right angles and leading respectively from the excitation lamp bore to the flow cell and from the flow cell to the photosensitive bore.

2. The flow cell block assembly of claim 1, and wherein said block assembly includes a detachable flow cell block provided with a vertical bore at the intersection of said right-angled optical paths, and wherein said flow cell comprises a transparent tube supportingly received in said last-named bore, aand wherein said inlet and outlet conduits extend through said detachable flow cell block and said flow cell is provided with respective sealing means to connect said inlet and outlet conduits to opposite ends of said transparent tube, said force-exerting means being applied at the top sealing means.

3. The flow cell block assembly of claim 2, and wherein said sealing means comprises respective plug elements sealingly secured to the conduits and engaged in said opposite ends of the tube.

4. The flow cell block assembly of claim 3, and wherein said retaining force-exerting means comprises an externally exposed clamping member threadedly engaged in the top end of said detachable flow cell block and clampingly engaging one of said plug elements and urging it inwardly in the tube, the other plug element bearing against the bottom end of the last-named bore.

5. The flow cell assembly of claim 4, and wherein said clamping member comprises a screw with an axial passage, one of the conduits extending through said axial passage.

6. The flow cell block assembly of claim 1, and excitation filter means in the optical path leading from the excitation lamp bore to the flow cell.

7. The flow cell block assembly of claim 1, and a rotatable apertured shutter sleeve of opaque material in the excitation lamp bore for performing dark current measurements.

8. The flow cell block assembly of claim 1, and wherein said block assembly is formed with a cavity to receive temperature-controlled liquid, and means to circulate temperature-controlled liquid through said cavity.

9. In combination, a photometer including a housing having a horizontal top wall and having a photosensitive element and an excitation lamp projecting upwardly in spaced parallel relationship from said top wall, a fluorometer flow cell block assembly detachably mounted on said top wall and having respective vertical bores receiving said photosensitive element and excitation lamp, said block assembly having an additional vertical bore containing a vertical transparent flow cell, said block assembly being formed with passage means defining optical paths at right angles and leading respectively from the excitation lamp bore to the flow cell and from the flow cell to the photosensitive element bore, inlet and outlet conduits, respective sealing means connecting said conduits to the opposite ends of said flow cell for passing a liquid sample therethrough, and adjustable clamping means at the top end of said additional bore exerting downward retaining force on the top sealing means and the flow cell.

10. The structural combination of claim 9, and excitation filter means in the optical path leading from the excitation lamp bore to the flow cell.

11. The structural combination of claim 10, and emission filter means between the flow cell and the photosensitive element.

12. The structural combination of claim 11, and a rotatable apertured shutter sleeve of opaque material having a vertical slot registrable with the optical path leading to the flow cell in the excitation lamp bore for performing dark current measurements.

13. The strucutral combination of claim 12, and wherein said shutter sleeve is provided with an external opaque top cover cap rigid therewith having a transparent index window spaced from the center of the cap to indicate the position of the slot.

14. The structural combination of claim 13, and wherein said block assembly is formed with a cavity to receive temperature-controlled liquid, and means to circulate temperature-controlled liquid through said cavity.

15. The structural combination of claim 9, and wherein said connecting means comprises respective plug elements sealingly secured to the conduits and engaged in said opposite ends of the cell.

16. The structural combination of claim 15, and wherein said clamping means comprises a clamping member threadedly engaged in said block assembly and clampingly engaging one of said plug elements and urging it inwardly in the cell.

17. The structural combination of claim 16, and an opaque sleeve in the bore surrounding said cell, said sleeve being formed with respective longitudinal slots registering with the right-angled optical paths.

18. The structural combination of claim 17, and an excitation filter member mounted in said block assembly in the optical path between said excitation lamp bore and said flow cell-receiving bore.

19. The structural combination of claim 18, and an emission filter element interposed in the optical path between said flow cell-receiving bore and the photosensitive element.

* * * * *

UNITED STATES PATENT OFFICE
CERTIFICATE OF CORRECTION

Patent No. 3,917,404　　　　　　　　　Dated November 4, 1975

Inventor(s) Louis Robert Heiss

It is certified that error appears in the above-identified patent and that said Letters Patent are hereby corrected as shown below:

Column 1, line 57, change "meaans" to -- means -- ; line 66, change "fluormetric" to -- fluorometric -- .

Column 2, line 56, change "cooperating" to -- cooperation -- ; line 62, change "aa" to -- a -- .

Column 5, line 13, change "aand" to -- and -- ; line 31, after "cell" insert -- block -- .

Column 6, line 23, change "strucutral" to -- structural -- .

Signed and Sealed this

Seventh Day of September 1976

[SEAL]

Attest:

RUTH C. MASON　　　　　　　　　C. MARSHALL DANN
*Attesting Officer*　　　　　　　*Commissioner of Patents and Trademarks*